3,513,102
Patented May 19, 1970

3,513,102
FLUORESCENT COATINGS
Ronald L. Heidke, Rochester, N.Y., assignor to Eastman Kodak Company, Rochester, N.Y., a corporation of New Jersey
No Drawing. Filed July 8, 1966, Ser. No. 563,678
Int. Cl. C09k 1/00; F21k 2/00
U.S. Cl. 252—301.2                                17 Claims

ABSTRACT OF THE DISCLOSURE

This invention relates to processes for making fluorescent coatings and to manufactures comprising improved fluorescent coatings made by such methods. A typical method according to the invention comprises dissolving an organic fluor and a solid-solution carrier for the fluor in a mutual liquid, such as an organic liquid, and then dispersing the liquid solution as emulsified particles in an aqueous dispersion of gelatinoid hydrosol, gelling said hydrosol and washing the gel with an aqueous liquid to dissolve out said mutual solvent.

---

This invention relates to processes for making fluorescent coatings and to manufactures comprising improved fluorescent coatings by such methods. Fluorescent coatings by the method of the invention are particularly useful in radiation-sensitive recording elements and especially we find them useful in direct electron-beam recording elements.

Fluorescent coatings find uses in a variety of radiation-sensitive recording elements, for example, in photographic color printing papers, X-ray films and plates, direct-electron-beam recording films, and the like. In some of such recording elements it is desirable that the fluorescent layer be transparent and water permeable and also be able to withstand aqueous processing soltuions such as photographic developers and fixing agents. Among methods for preparing such fluorescent coated layers are those which comprise the steps of first dissolving an organic fluor and a solid-solution carrier for the fluor in a mutual solvent liquid, usually an organic liquid, and then dispersing the liquid solution as emulsified particles in an aqueous dispersion of a hydrophilic colloid such as gelatin and the like. This dispersion may then be coated directly and dried or may be gelled, dried and melt coated or dried, redispersed and coated. Coatings that we have prepared by these methods tend to be appreciably tacky in some instances. In other instances the coatings by the method were found to be cloudy or were found to show repellency by drying to an uneven spread on the supporting surface. These disadvantages are thought to result from incomplete removal of the liquid mutual solvent in the drying step.

An object of the present invention is to provide an improved method for making fluorescent coatings. Another object is to provide radiation-sensitive elements comprising a radiation-sensitive layer and a thin, transparent, evenly spread, non-tacky, fluorescent film that is water permeable and is able to withstand aqueous processing liquids. These and other objects and advantages are obtained by means of the invention, preferred embodiments of which are described in detail below and which are defined in the claims.

According to the present invention, we have improved the method described above for making fluorescent films by using as the mutual solvent liquid (mutual solvent for the organic fluor and the solid-solution carrier), an organic liquid that is at least slightly soluble in water and by dissolving out this mutual solvent by thorough washing with water, after the liquid solution of organic fluor and carrier have been dispersed in aqueous colloid dispersion and before coating. This washing step prior to coating may be carried out conveniently by chill setting the dispersion, then noodling and washing it thoroughly with cold water to dissolve out the mutual solvent. After the wash step, the dispersion may be handled and coated by conventional gelatin emulsion coating procedures. In other embodiments, a dispersion may be washed to remove the mutual solvent by methods other than the chill set, noodle, and dry procedure. For example, a dispersion might be washed by coagulation and washing procedures of the kinds described in U.S. Pats. 2,614,929; 2,728,662; 3,132,945; 2,565,418; 2,618,556; and 2,691,582.

Following is a detailed description of specific examples embodying the invention.

EXAMPLE I

In 109 ml. of ethyl acetate was dissolved 17.0 g. of a copolymer of 70 percent butyl acrylate, 30 percent styrene having inherent viscosity estimated about 0.5 to 0.6 as would be measured in acetone, and 1.85 g. of 3-phenyl-7-ureidocoumarin (described in Example 3 of British Pat. No. 786,234). After the ingredients were all dissolved, the solution was stirred, at 45° C., into 200 ml. of 10 percent aqueous gelatin solution which also contained 11.1 ml. of 13.1 percent aqueous alkanol B (propylated naphthalene sulfonate) solution and 10 ml. of ethyl acetate. The mixture was then dispersed for two minutes in a high-speed mixer to thoroughly disperse fine particles of the organic solution in the aqueous medium. The dispersion was then chill set, noodled and washed thoroughly for six hours with water at 5° C. to dissolve out the ethyl acetate. The dispersion was then melted, filtered, and refrigerated until use. After washing, the size of the carrier particles, which contained the organic fluor in solid solution, was less than ½ micron. The dispersion was then melt coated at 40° C. on a polyester film support which previously had been subbed with an electrically conductive film of poly(methylacrylate, vinylidene chloride, itaconic acid) terpolymer having cuprous iodide finely dispersed therein. Conducting layers of this type are described in detail in U.S. Pat. No. 3,245,833 patented Apr. 12, 1966. The fluorescent coating was spread at 200 mg. per square foot dry solids over the conducting layer and dried. The finished coating was transparent with excellent clarity; the spread was smooth and even with no apparent repellency; and the coating was not tacky. When subjected to electron bombardment in vacuum at 10 kev., the coating fluoroesced well. The quantium yield was considerably better than was obtained with dispersion made similarly but using only the organic fluorescent compound without a solid-solution carrier. Other coatings made as described above except without the wash step exhibited some tackiness after drying and were not spread evenly, evidencing some surface repellency. Tackiness and repellency were satisfactorily eliminated by means of the washing step which practically removes the mutual solvent liquid from the emulsion. The coated element described above is especially useful as a film support for a silver halide emulsion layer sensitive to direct electron beam radiation. Electron-beam-sensitive recording layers coated on this support can be processed in photographic developing and fixing solutions without damage to the scintillating layer; after development, the films can be used in read-out processes which involve the fluorescent characteristic of the scintillator layer. See B. Miller, "Electron Beam Read-Out Shows Potential," Aviation Week and Space Technology, Apr. 13, 1964, pages 107–110.

EXAMPLE II

Cuprous iodide (2.4 g.) was dissolved in a mixture of 200 ml. methyl ethyl ketone and 4.0 ml. of trimethyl phosphite, then 40 ml. of a 5 percent solution of a terpolymer poly(methylacrylate-vinylidene chloride-itaconic acid) in 90 percent methyl ethyl ketone and 10 percent cyclohexanone was added. The solution was filtered and then machine coated by bead application on a subbed polyester film support to give a coverage of 5 mg. of copper per square foot. The coating was dried at 110° C. and then cured at 120° C. for 10 minutes. The coating was clear and surface resistivity was $1.7 \times 10^5$ ohms per square. A protective layer of Vinylite VMCH was solution-coated from a ketone solvent over the conducting layer. This protective coating was dried at 95° C. and cured at 100° C. for four minutes. Over this protective layer, a thin subbing of cellulose nitrate (from a 1.4 percent solution in methanol) was applied to improve adhesion. A gelatin subbing was applied and a gelatin-silver halide photographic emulsion of the Lippman type was coated over the subbing. For various uses we may substitute other photographic emulsions of the negative type or direct positive type emulsions, for example, a fogged direct positive emulsion. The radiation-sensitive layer will be selected for the particular use intended. A fluorescent coating was coated over the sensitive layer of silver halide as follows. An emulsion of water-insoluble particles of organic solution dispersed in aqueous gelatin solution was prepared as described in Example I, except instead of 3-phenyl-7-ureidocoumarin there was substituted 1.85 g. of diphenyloxazole and .46 g. of 1,4-bis[2-(5-phenyl-oxazolyl)]-benzene. The dispersion was chill set, noodled, and washed as before and then melted and coated over the sensitive layer of silver halide on the element described above. The ability of this fluorescent coating to be permeated by aqueous photographic processing solutions without being detached or deteriorated is particularly advantageous in this embodiment in which the fluorescent coating overlies the silver halide photographic recording layer. Thus the fluorescent layer, which can be applied when the film is manufactured, permits photographic development through the layer and remains on the finished photograph. This example illustrates use of a mixture of primary and secondary fluorescent compounds in a preferred embodiment of the invention.

The foregoing examples are only for the purpose of describing preferred modes of carrying out the invention and it should be expressly understood that my invention embraces variations of materials, use of various proportions, and varying positions of the respective layers, other than those specifically described in the detailed examples.

By the term hydrophilic colloid I mean to include the various gelatins and other water-permeable-film-forming materials such as other protein derivatives, e.g. casein, and various synthetic resins of the class capable of forming a water-permeable film layer coated for aqueout medium. For example, instead of gelatin I may substitute cellulose and other polysaccharide derivatives such as described in U.S. Pat. 2,964,405 and U.S. Pat. 2,448,-538, and various vinyl polymers such as those described in U.S. Pat. 2,376,371; U.S. Pat. 2,414,207, and U.S. Pat. 3,062,674. A wide variety of hydrophilic film-forming colloids are useful as substitutes for gelatin in my invention.

For the solid-solution carrier, instead of resin, I may select from other water-insoluble resins and organic solids that form solid solution with the selected fluorescent compounds.

Preferably, such solid-solution carriers have refractive indexes close to that of gelatin and we especially prefer solid-solution carriers that also improve the quantum output of the organic scintillator compounds with which they are combined in solid solution. Generally, polymers of styrene and copolymers of styrene with lower alkyl acrylates, in proportions ranging from about 20:80 to about 80:20, are suitable; we prefer polymers and copolymers of this type having molecular weights in the range corresponding to inherent viscosities, measured in acetone, from about 0.4 to about 1.5. Other synthetic resins having distinctive aromatic character and in this molecular weight range may be used. We have used, for example, polyvinyl benzoate.

We prefer to use organic fluorescent compounds, also called organic scintillators or organic fluors which have maximum emission in the range from 350–400 millimicrons, however, we may select from other organic, water-insoluble fluorescent compounds which are suitable for any particular use. Often a mixture of organic fluorescent compounds, will be preferred, for example as illustrated in Example II. We may use a mixture comprising a primary and a secondary scintillator. Generally, suitable organic fluorescent compounds may be selected, for example, from those described and referred to as "organic fluors" and "organic scintillators" in Organic Scintillation Detectors by E. Schram, R. Lombaert, Elsvier Publishing Co., 1963. For use in electron beam read-out applications, we prefer a scintillator having very rapid luminescent decay and for this purpose we prefer a compound selected from oxazole and oxadiazole scintillators having structures of the class shown below:

wherein Ar is a radical comprising an aromatic nucleus. Usually the preferred concentration of organic scintillator in fluorescent coatings of this type will be in the range from about 0.2 percent to about 10 percent by weight, based on the weight of the solid solution carrier. The preferred ratio of solid solution carrier to the gelatinoid in the coatings usually will be in the range from about 3:1 to about 5:1. A particular advantage attained practically by this method is the relatively high concentration of fluorescent compound in the coated layer which, combined with the good quantum yield gives an excellent fluorescent coating in practice.

In various embodiments, fluorescent coatings of the invention may be coated on a variety of supports. In photographic embodiments, the fluorescent coating may be on any of the various film, paper and plate supports of the kinds used in photographic elements, e.g. cellulose ester and other polyester film supports, various paper and foil and coated paper supports, glass and other rigid plates, self-supporting photosensitive films, and the like.

As illustrated by the examples, the position of the fluorescent layer may be either over or under the radiation-sensitive recording layer on the same side of the support. Further, the fluorescent layer may be positioned on the side of the support opposite the recording layer. In some embodiments we may use more than one fluorescent layer, for example in radiation-sensitive elements having a radiation-sensitive coating on each side of the support. The coating made according to the present invention may be used in other applications outside the photographic arts, wherever thin fluorescent coatings of the kind described are useful.

The invention contemplates fluorescent layers of the kind described which in addition may contain other functional components. For example, the fluorescent layer may further comprise photosensitive silver halide grains dispersed in the continuous phase of the emulsion, so that the layer is also functional as a photographic recording layer as well as being fluorescent. In still further embodiments the fluorescent layer may contain pigments, hardeners, color-forming components, etc., in addition to the components essential to the fluorescent layers as described above.

It will be understood that modifications and variations may be made within the scope of the invention as described above and as defined in the following claims.

I claim:
1. A method of preparing a dispersion which comprises a disperse phase of water-insoluble organic fluorescent compound in solid solution with a water-insoluble synthetic resin solid-solution carrier, dispersed as fine particles in a continuous aqueous phase comprising a hydrophilic colloid, said method comprising the steps of
   (1) dissolving said fluorescent compound and carrier solvent in a mutual solvent liquid which is at least slightly soluble in water,
   (2) dispersing the liquid solution so formed as fine particles in an aqueous phase comprising a hydrophilic colloid,
   (3) gelling or coagulating the dispersion and
   (4) thoroughly washing the dispersion so formed with water to dissolve out substantially all of said mutual solvent liquid.

2. In a method of preparing and coating a fluorescent film coat on a supporting surface wherein a water-insoluble organic fluor and a water-insoluble, synthetic resin solid-solution carrier for said organic fluor are first dissolved in a mutual solvent liquid and the solution so made is then finely dispersed in gelatinoid hydrosol and the dispersion so made is subsequently coated as a thin film on a support, the improvement wherein said mutual solvent liquid is at least slightly soluble in water and said hydrosol is first gelled and then thoroughly washed with water to remove substantially all of said mutual solvent liquid from the gel prior to the coating step.

3. A method of preparing and making a water-permeable fluorescent layer on a support, comprising the steps of
   (1) dissolving a water-insoluble organic fluorescent compound and a water-insoluble, synthetic resin solid-solution carrier for said fluorescent compound in a mutual solvent liquid which is at least slightly soluble in water,
   (2) dispersing the liquid solution so formed as fine particles in a gelatinoid hydrosol,
   (3) gelling said hydrosol to form a dispersion of said particles in the gel,
   (4) washing the gel in its gel state with water to dissolve out substantially all of said mutual solvent liquid, and
   (5) after said washing step, coating the gelatinoid suspension as a thin layer on a support.

4. A method as defined in claim 3 wherein said solid solution carrier is a water-insoluble synthetic resin containing aromatic groups, said mutual solvent liquid is ethyl acetate and said gelatinoid is gelatin.

5. A method as defined in claim 4 wherein said synthetic resin is selected from polystyrene and lower alkyl acrylate-styrene copolymers.

6. A method as defined in claim 3 wherein said organic fluorescent compound is selected from oxazole and oxadiazole scintillators having maximum emission between 350–400 m$\mu$.

7. A method as defined in claim 4 wherein the refractive index of said synthetic resin is near the same as the refractive index of gelatin.

8. A method as defined in claim 3 wherein said liquid mutual solvent is ethyl acetate.

9. A method as defined in claim 5 wherein said organic fluorescent compound is 3-phenyl-7-ureidocoumarin, said solid-solution carrier is a butylacrylate-styrene copolymer.

10. A radiation-sensitive element comprising a support and at least one fluorescent layer prepared by (1) dissolving a water-insoluble organic fluorescent compound and a water-insoluble synthetic resin solid-solution carrier for said fluorescent compound in a mutual solvent liquid which is at least slightly soluble in water, (2) dispersing the liquid composition so formed as fine particles in a gelatinoid hydrosol, (3) gelling or coagulating said hydrosol and (4) washing said gelatinoid dispersion with water to remove said mutual solvent liquid.

11. A radiation-sensitive element according to claim 10 wherein said mutual solvent liquid is ethyl acetate, said gelatinoid is gelatin and said solid-solution carrier is a synthetic resin selected from polystyrene and lower alkyl acrylated-styrene copolymers.

12. A radiation-sensitive element as described in claim 10 wherein said organic fluorescent compound is 3-phenyl-7-ureidocoumarin and said solid-solution carrier is a butylacrylate-styrene copolymer.

13. A radiation-sensitive element according to claim 10 wherein the refractive index of said synthetic resin is nearly the same as the refractive index of gelatin.

14. A radiation-sensitive element according to claim 10 which comprises a silver halide recording layer positioned between said fluorescent layer and said support.

15. A radiation-sensitive element according to claim 14 further comprising a conducting layer.

16. A radiation-sensitive element according to claim 10 wherein said fluorescent layer comprises from 0.2 percent to 10 percent by weight based on the weight of the solid-solution carrier of said water-insoluble organic fluorescent compound.

17. A radiation-sensitive element according to claim 16 wherein the ratio of solid-solution carrier to said gelatinoid is about 3:1 to about 5:1.

References Cited

UNITED STATES PATENTS

| | | | |
|---|---|---|---|
| 3,406,070 | 10/1968 | Oetiker et al. | 96—82 |
| 2,852,386 | 9/1958 | Tong | 96—114 |

HELEN M. McCARTHY, Primary Examiner

W. T. SCOTT, Assistant Examiner

U.S. Cl. X.R.

96—45.1, 82; 117—33.5, 34; 252—316

PO-1050
(5/69)

UNITED STATES PATENT OFFICE
CERTIFICATE OF CORRECTION

Patent No. 3,513,102     Dated May 19, 1970

Inventor(s) Ronald L. Heidke

It is certified that error appears in the above-identified patent and that said Letters Patent are hereby corrected as shown below:

Column 1, line 38, "soltuions" should read --solutions--.
Column 2, line 52, "fluoroesced" should read --fluoresced--; line 52, "quantium" should read --quantum--; line 53, "dispersion" should read --dispersions--. Column 3, lines 57-58, "aqueout" should read --aqueous--. Column 4, after line 26, the second structure shown as

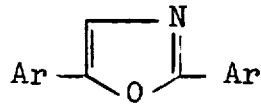    should read    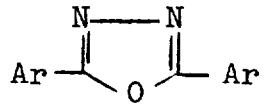

Column 6, line 25, "acrylated-styrene" should read --acrylate-styrene--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents